Feb. 27, 1962 M. J. HILLMAN 3,023,354
VOLTAGE AND CURRENT REGULATOR
Filed Jan. 20, 1958 3 Sheets-Sheet 1

INVENTOR:
Murray J. Hillman
Attorney

Feb. 27, 1962  M. J. HILLMAN  3,023,354
VOLTAGE AND CURRENT REGULATOR
Filed Jan. 20, 1958  3 Sheets-Sheet 2

INVENTOR:
Murray J. Hillman
Attorney

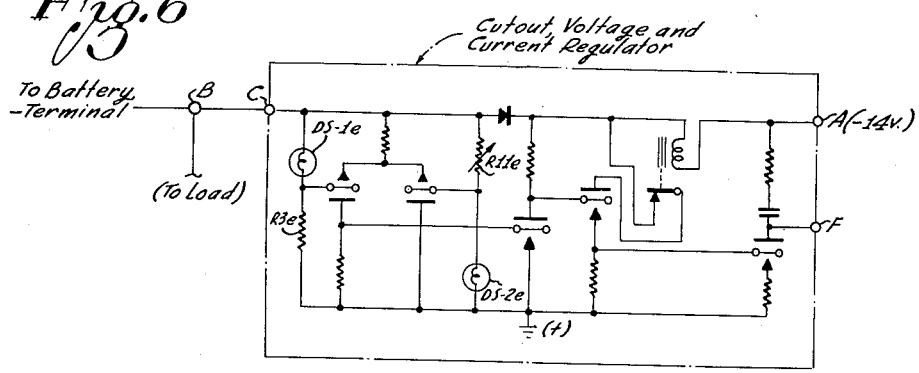
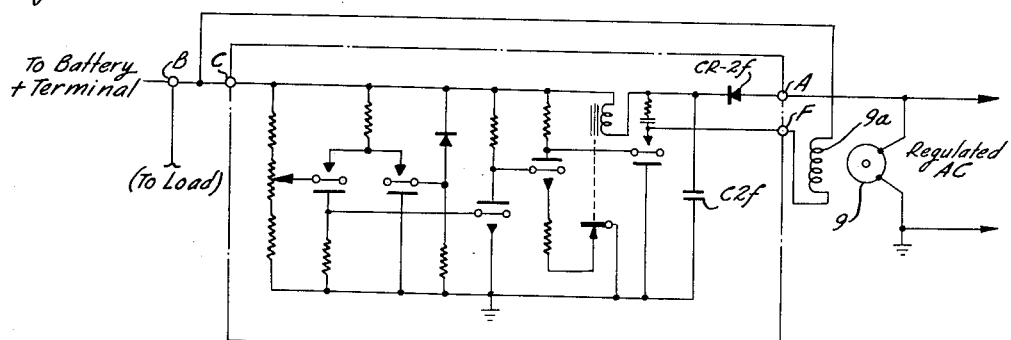
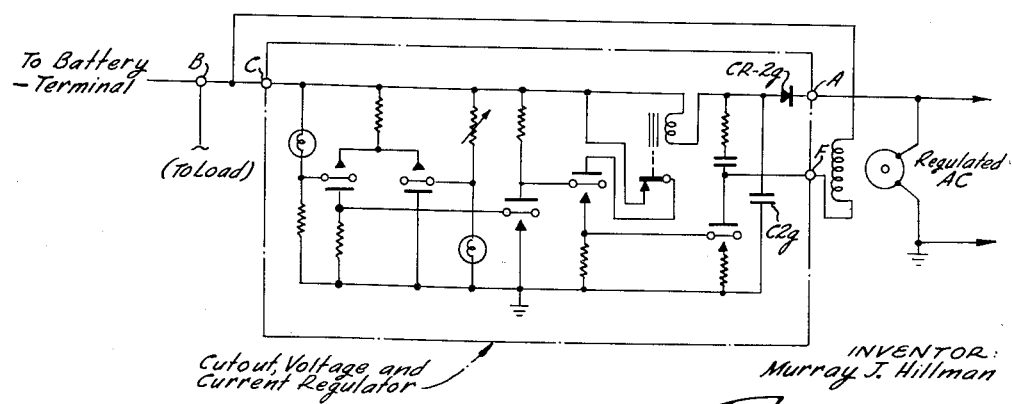

United States Patent Office 3,023,354
Patented Feb. 27, 1962

3,023,354
VOLTAGE AND CURRENT REGULATOR
Murray J. Hillman, West Covina, Calif., assignor to Hycon Mfg. Company, Pasadena, Calif., a corporation of Delaware
Filed Jan. 20, 1958, Ser. No. 709,995
4 Claims. (Cl. 322—25)

My invention relates generally to electrical regulators and more particularly to a novel and useful electrical regulation system for aircraft and automotive vehicles.

Most electrical regulators which are now used in aircraft and automotive electrical systems comprise three relays—a cutout relay, a voltage regulating relay, and a current regulating relay, as is well known. The cutout relay, or more simply, the cutout, prevents reverse current flow from the vehicle battery to the generator, and the current regulating relay is a limiting relay which operates to limit the maximum current that the generator can put out, to prevent the generator from burning out. The voltage regulating relay operates to regulate the output voltage of the generator and is generally a vibrating contact device. This relay is particularly subject and prone to contact failure, resulting in unreliable system regulation.

It is an object of my invention to provide an electrical regulator which is reliable in operation and is not subject to contact failure as in a vibrating contact device.

Another object of my invention is to provide a voltage and current regulator which can be used with an ordinary cutout relay to provide reliable voltage and current regulation of the output of a D.C. generator.

Another object of the invention is to provide a universal electrical regulator for regulating the output of either a D.C. generator or an A.C. alternator.

A further object of my invention is to provide a novel regulator which is unaffected in operational accuracy by variations of ambient temperature.

A still further object of my invention is to provide a regulator including means for preventing reverse current flow, voltage regulation means, and current limiting means, which is capable of extremely compact construction and miniaturization.

Briefly, and considered in general terms, the foregoing objects are preferably accomplished by providing in an electrical system including a generator and usually a storage battery, a regulator comprising a comparator section for sensing an error signal, or departure from the correct output voltage, of either the generator or battery, and an amplifier for amplifying the error signal and applying it to control the output of the generator to reduce and eliminate the error. A current limiting relay is also included and is operated when excessive current flow from the generator occurs. The current limiting relay operates to de-energize the amplifier from further exciting the generator field. A cutout diode is provided in the regulator to prevent reverse current flow from battery to generator. This diode, when properly positioned, renders the regulator capable of regulating both A.C. and D.C. generators.

My invention possesses other objects and features, some of which together with the foregoing, will be set forth in the following detailed description of a preferred embodiment of my invention, and the invention will be more fully understood by reading the description with joint reference to the attached drawings, in which:

FIGURE 4 is a circuit diagram illustrating another version of my invention which employs a differential amplifier in the comparator section and which can be used in a negatively grounded system;

FIGURE 5 shows a circuit diagram which is similar to that of FIGURE 4, and is designed for use in a positively grounded system;

FIGURE 6 is a circuit diagram of yet another version of my invention wherein the comparator section of the regulator includes both lamps and a differential amplifier;

FIGURE 7 is a circuit diagram of the electrical system of a vehicle having a negatively grounded battery and an A.C. alternator which is regulated by a universal regulator version of my invention; and FIGURE 8 is a circuit diagram similar to that of FIGURE 7 and specifically shows a universal regulator for use in a system including a positively grounded battery.

Figure 1:
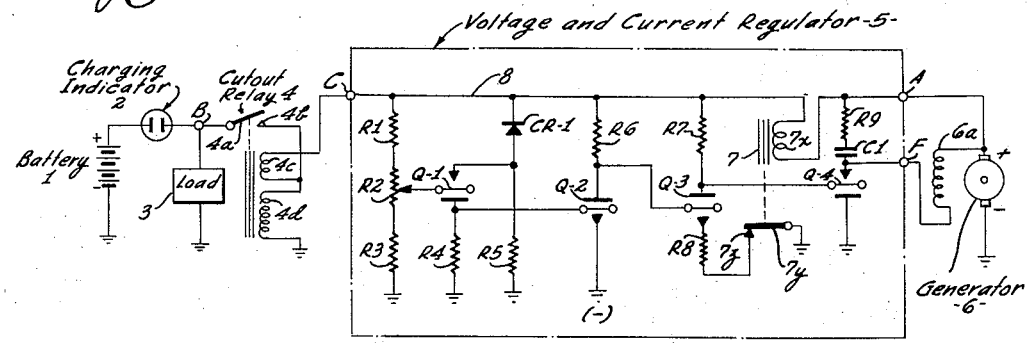
FIGURE 1 is a circuit diagram of a negatively grounded electrical system of an automobile, for example, including a voltage and current regulator according to my invention.

A high quality and reliable regulation system as used in automobiles, for example, is shown in FIGURE 1. Battery 1 is grounded on its negative terminal and the positive terminal of the battery 1 is connected through a charging indicator 2 which can be an ammeter, for example, at junction point B to supply load 3. Load 3 includes items such as head lamps, tail lamps and various electrically operated accessories, which are grounded on one side as indicated by the ground connection of load 3. A cutout relay 4 connects the positive terminal of battery 1 through charging indicator 2 to terminal C of voltage and current regulator 5. The cutout relay 4 is conventional, having an armature $4a$ which makes with contact $4b$ when the relay 4 is actuated. The contact $4b$ is connected to terminal C through relay current coil $4c$, and contact $4b$ is additionally connected to ground through relay voltage coil $4d$. Relay 4 is actuated when current flows from terminal C through the current coil $4c$ and voltage coil $4d$, as when D.C. generator 6 produces an adequate output voltage. If, however, D.C. generator 6 is stopped, or not generating sufficiently such that a reverse current flows from battery 1 to D.C. generator 6, the reverse flow through the current coil $4c$ opposes the action of the voltage coil $4d$ and allows the normally spring-loaded open armature to overcome the electromagnetic pull of the relay. In this way, the battery 1 cannot lock the relay 4 in a closed condition. Terminal A is connected to the positive armature brush of D.C. generator 6 which has its negative armature brush connected to ground. Terminal F of the voltage and current regulator 5 is also connected to the positive armature brush of D.C. generator 6 through field winding $6a$.

Terminal C of the voltage and current regulator 5 is connected to terminal A through the control coil $7x$ of a small relay 7. Relay 7 has a grounded armature $7y$ which is normally spring-loaded closed to make with contact $7z$ as indicated. The spring (not shown) setting is adjusted so that the relay 7 is actuated for currents through the control coil $7x$ greater than some particular maximum that D.C. generator 6 can produce without danger of burning out. Thus, relay 7 regulates current in the system and is actuated only when armature current from generator 6 exceeds a specified maximum.

Lead 8, connecting terminal C to relay coil $7x$, is connected to ground by three series connected resistors R1, R2 and R3, as shown in FIGURE 1. Resistor R2 has an adjustable tap which is connected to the base of transistor Q–1. The emitter of transistor Q–1 is connected to the anode of reference diode CR–1, which is preferably a Zener breakdown diode, the cathode of which is connected to lead 8, and the collector of transistor Q–1 is connected to ground through resistor R4. The anode of diode CR-1 is connected to ground through resistor R5, and the collector of transistor Q-1 is further connected to the base of transistor Q-2. The emitter of transistor Q-2 is connected directly to ground and its collector is connected to lead 8 through resistor R6. The collector of transistor Q-2 is also connected to the base of transistor Q-3, the collector of which is connected to lead 8 through resistor R7 and the emitter connected to contact 7z of relay 7 through resistor R8. Finally, the collector of transistor Q-3 is connected to the base of transistor Q-4 which has its collector directly grounded and its emitter connected to terminal F and the field winding 6a of D.C. generator 6. A resistor R9 in series with a capacitor C1 are connected between terminals A and F as shown.

The operation of the circuit of FIGURE 1 is described wherein the armature of D.C. generator 6 is considered mechanically coupled to and driven by the engine of, for example, an automobile. When the output voltage generated is high enough, the current coil 4c and voltage coil 4d of the cutout relay 4 are properly energized to cause relay armature 4a to make with its contact 4b, connecting the D.C. generator output with load 3 and battery 1. The setting of the tap on resistor R2 initially is such that when the D.C. generator 6 output is at a desired value, for example, +7.2 volts and rated output current, the tap of resistor R2 and the emitter of transistor Q-1 are at the same potential and a reference or correct output signal is obtained from the collector of the transistor Q-1. Three resistors R1, R2 and R3 were shown which form a voltage divider. It is obvious that a single potentiometer resistor can be used, or that two correctly selected series resistors can be substituted for the three resistors R1, R2 and R3. However, the purpose of showing three series resistors is conventional practice in schematics to indicate that only a small adjustment range is normally required. If, now, the engine is accelerated, causing a rise in output voltage on lead 8, this increase in voltage will be impressed on the emitter of transistor Q-1. The full positive change appears on the emitter of transistor Q-1 because of the well known reverse voltage breakdown characteristic of breakdown diode CR-1 which is selected to operate well in the reverse current region. At the same time, however, a fraction of the change in voltage, or error signal, appears on the base of transistor Q-1 since the increase in voltage also appears across the voltage divider including resistors R1, R2 and R3. As a consequence, a net error signal which is equal to the difference in potential between the emitter and the base of the transistor Q-1 is amplified by transistor Q-1 and applied to the base of transistor Q-2.

Transistor Q-1 is a type p-n-p transistor and a positive rise in potential of the emitter causes transistor Q-1 to conduct more heavily such that a higher potential is impressed on the base of transistor Q-2. Transistor Q-2, a type n-p-n transistor, accordingly conducts more heavily which results in a decrease in potential to the base of transistor Q-3, which is also a type n-p-n transistor. Transistor Q-3 will conduct less heavily in turn, and produce a rise in potential to the base of transistor Q-4, which is a type p-n-p transistor. This causes transistor Q-4 to conduct less heavily, reducing the field current through field winding 6a to lower the output voltage of the D.C. generator 6. Thus, the error voltage or increase in voltage will be returned virtually to zero error.

A similar but opposite action takes place when a drop in armature voltage occurs. The transistors Q-1 and Q-2 will conduct less heavily, transistor Q-3 more heavily, and transistor Q-4 more heavily to produce action opposite to that described before, increasing the field current and armature output voltage of D.C. generator 6. Actually, any deviation from correct output voltage, or the error signal, is normally imperceptible since the nulling system is constantly self correcting and system gain is high. The value of resistor R8 is selected as a compromise between bias stability of transistor Q-3 and maximum field current and consequently, the maximum power output of the D.C. generator 6. The connecting relay 7 can have very light duty contact points which can accommodate, for example, 100 milliamperes. Resistor R9 can be selected to approximately equal the resistance of field winding 6a, and the capacitor C1 can be selected to be equal in value to the field winding inductance divided by the square of the field winding resistance. A purely resistive circuit will then be presented, eliminating inductive transients from the field winding 6a, and will prevent damage to transistor Q-4 by such transients.

Component types and values are listed below which produce a highly satisfactory operating circuit. While specific values and types are given here and elsewhere, these have been noted as examples only, and are not intended to restrict the breadth and scope of my invention.

| | |
|---|---|
| R1 | 2.7 kilohms. |
| R2 | 250 ohms. |
| R3 | 470 ohms. |
| R4 | 2.0 kilohms. |
| R5 | 510 ohms. |
| R6 | 2.2 kilohms. |
| R7 | 120 ohms. |
| R8 | 10 ohms. |
| R9 | 7 ohms. |
| CR-1 | Texas Instruments 651C. |
| Q-1 | 2N34. |
| Q-2 | 2N35. |
| Q-3 | 2N102. |
| Q-4 | 2N174. |
| C1 | 150 microfarads. |

Figure 2:
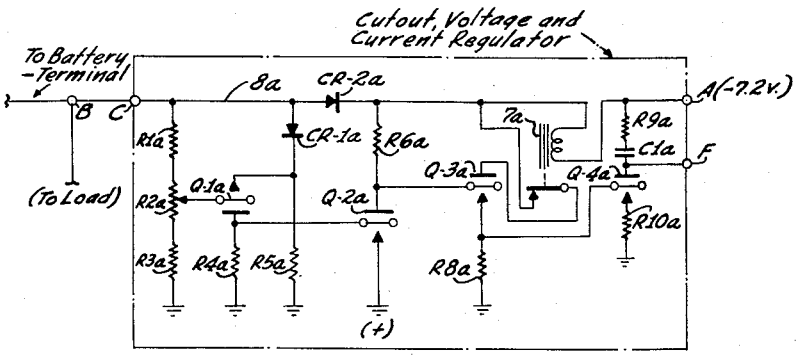
FIGURE 2 is a circuit diagram of a cutout, voltage and current regulator of preferred construction for use in a positively grounded electrical system of a vehicle.

The circuit shown in FIGURE 2 is designed for systems having a positive grounded battery terminal and a grounded D.C. generator positive armature brush. The circuit is very similar to that of FIGURE 1 except that the transistors Q-1a, Q-2a and Q-3a corresponding to transistors Q-1, Q-2 and Q-3 are of opposite types, respectively, to each of the originals. The transistor Q-3a corresponding to transistors Q-3 is connected instead as an emitter follower having relay 7a connected to break the collector circuit, and the transistor Q-4a corresponding to transistor Q-4 is inverted and its emitter grounded through a resistor R10a. The breakdown diode CR-1a corresponding to breakdown diode CR-1 is, of course, connected in a reversed orientation. The circuit functions substantially the same as that of FIGURE 1. A cutout diode CR-2a, however, has been added to the circuit of FIGURE 2 and a cutout relay such as relay 4 is not necessary. A similar cutout diode can be correspondingly inserted in the circuit of FIGURE 1, in a reversed orientation, of course, to replace or eliminate the cutout relay 4. The cutout diodes can be inserted in lead 8 (or lead 8a) anywhere after the comparator section following reference diode CR-1 (or CR-1a). Thus, terminal B can be connected directly to terminal C, and terminal B is connected back to the battery negative terminal through a suitable charging indicator (not shown) in FIGURE 2. Where a cutout diode is used, terminal B can be connected to terminal C through the ignition switch (not shown) if desired.

Illustrative component values and types for the circuit of FIGURE 2 are listed as follows.

| | |
|---|---|
| R1a | 2.7 kilohms. |
| R2a | 250 ohms. |
| R3a | 470 ohms. |
| R4a | 2 kilohms. |
| R5a | 510 ohms. |
| R6a | 820 ohms. |
| R8a | 25 ohms. |
| R9a | 7 ohms. |
| R10a | .5 ohm. |

| | |
|---|---|
| CR–1a | Texas Instruments 651C. |
| CR–2a | International Rectifier Corp. Type 30 LM1. |
| Q–1a | 2N35. |
| Q–2a | 2N34. |
| Q–3a | 2N101. |
| Q–4a | 2N174. |
| C1a | 150 microfarads. |

Figure 3:
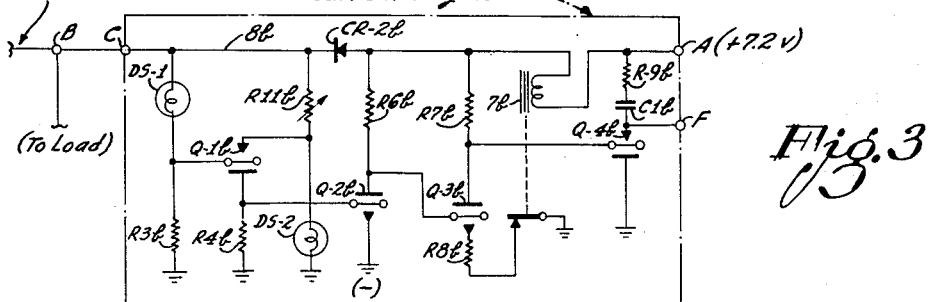
FIGURE 3 is a circuit diagram of a slightly different version of the cutout, voltage and current regulator wherein lamps are used in the comparator section for obtaining a larger error control signal.

A slightly different and novel version of my invention is shown in FIGURE 3. Here, resistors R1 and R2 are replaced by a small tungsten filament lamp DS–1 which can be just an ordinary 6 or 12 volt lamp used for panel or instrument lighting, and are commonly sold for five to ten cents each (for example, a No. 47 lamp). The resistance of such lamps increases with increasing voltage, as is well known. For about zero volts across a filament, the resistance is about 10 percent of resistance at rated voltage and rises with increasing voltage to give about 60 percent of resistance at rated voltage at 50 percent of rated voltage. Resistance initially increases a little more rapidly than voltage producing a concave downward curve which later levels out with increasing voltage (on the abscissa). Resistor R5 is also replaced with a similar tungsten filament lamp DS–2, and the diode CR–1 is replaced by adjustable resistor R11b. Resistor R11b is shown as adjustable to establish a correct circuit condition and can be replaced immediately afterwards with a fixed value resistor. It is noted that one of the lamps DS–1 or DS–2 can be replaced by a resistor so that only one lamp is left in the circuit. This, however, results in a smaller error signal which can be amplified.

Assume that the circuit is set properly for a correct output voltage from the armature of a D.C. generator connected to terminal A, and there is a rise in output voltage which appears on lead 8b. This causes a rise in resistance of both lamps DS–1 and DS–2 because of their resistance versus voltage characteristic. The emitter of transistor Q–1b accordingly rises in potential and its base drops in potential. This, of course, causes increased current flow through the transistor Q–1b such that a higher potential is presented to the base of transistor Q–2b which, in turn, produces a larger drop across collector resistor R6b and produces a lower potential on the base of transistor Q–3b. This reduces the current flow through transistor Q–3b and causes a rise in potential at the base of transistor Q–4b. Transistor Q–4b thus conducts less current such that the field winding connected in series at terminal F also conducts less current and a lower output voltage is produced from the armature of the D.C. generator connecting with terminal A. The lamps DS–1 and DS–2 are preferably operated visibly lit so that variation in ambient temperature produces negligible effect on filament resistance, and filament resistance is responsive only to current flow through it. When the lamps are visibly lit the filament is so hot that current flow governs filament resistance and ambient temperature becomes immaterial to the lamps. The lamps can thus provide an indication of proper circuit operation. This light indication is particularly desirable where mass provided (low priced) lamps are used, since they may be more apt to fail when subjected to excessive vibration, for example. Reliable and definitely durable lamps having small grain coiled tungsten filaments for vibration proof lamps are of course readily available at higher costs but the light indication is still desirable for a visible and quick check that the lamps are functioning properly.

A similar but opposite action occurs when there is a drop in armature voltage which appears on lead 8b. The lamps DS–1 and DS–2 both drop in resistance because of their resistance versus voltage characteristic, and transistor Q–1b will conduct less heavily. Transistor Q–2b in turn also conducts less heavily, and transistors Q–3b and Q–4b will conduct more heavily. The net result is that the field winding connecting with terminal F conducts more current and produces a rise in armature output voltage, returning the system to a correct operating condition. It is noted that the circuit of FIGURE 3 includes a cutout diode CR–2b which prevents reverse current flow from the battery to the D.C. generator armature connected to terminal A, when armature output voltage is not sufficiently high.

The effective error signal which is used for circuit control in the circuits of FIGURES 1 and 2 is not the full error signal that appears on lead 8 (FIGURE 1) but is the difference between the full error signal appearing on the emitter of the first transistor and a portion of the error signal appearing on the base thereof. The use of the lamps DS–1 and DS–2 in the circuit of FIGURE 3 makes available a much larger error signal for circuit control than before. In fact, the entire error signal can be fully effective in the circuit of FIGURE 3. Since the base to emitter forward junction drop is intrinsic in the comparator section of the circuits of FIGURES 1, 2 and 3, variation of base to emitter forward junction potential with ambient temperature will appear as an "offset" in the output voltage. This effect with junction type transistors is typically on the order of 2.5 millivolts per degree centigrade, and is totally negligible for virtually all practical situations, especially in regulation of automotive and aircraft systems.

An extremely precise voltage and current regulator circuit is shown in FIGURE 4. The version illustrated there employs a differential amplifier in the comparator section, so that to a first approximation, comparator action is not affected by ambient temperature. The difference between the circuit of FIGURE 1 and that of FIGURE 4 is essentially that the transistor Q–1 is replaced by transistors Q–5c and Q–6c which comprise a differential amplifier. The tap of resistor R2c is connected to the base of transistor Q–5c and the anode of breakdown diode CR–1c is connected to the base of transistor Q–6c. The emitters of the transistors Q–5c and Q–6c are both connected to lead 8c through a resistor R12c. The collector of transistor Q–5c is grounded through resistor R13c, and the collector of transistor Q–6c is directly grounded. The collector of transistor Q–5c is connected to the base of transistor Q–2c. It is apparent that variation of base to emitter forward junction potential with ambient temperature takes place in both transistors Q–5c and Q–6c, and a net resultant difference signal is not presented to the differential amplifier. A rise in potential on lead 8c, however, is applied fully to the base of transistor Q–6c and partially (divided) to the base of transistor Q–5c. A difference input signal is thus presented to the differential amplifier causing increased current flow through transistor Q–5c and produces a higher potential on the base of transistor Q–2c. The result, similar to that previously described, is that transistors Q–3c and Q–4c both conduct less, and the field winding connected to terminal F also conducts less current which causes reduction of armature output voltage, eliminating the original error signal.

The circuit of FIGURE 4 is designed for a system having a grounded negative battery terminal and grounded negative armature brush of the D.C. generator. The circuit shown in FIGURE 5 is designed for a system having a grounded positive battery terminal and grounded positive armature brush of the D.C. generator. Illustrative component values and types for the circuit of FIGURE 4 are listed below and are suitable for a 14 volt system.

| | |
|---|---|
| R1c | 470 ohms. |
| R2c | 100 ohms. |
| R3c | 680 ohms. |
| R5c | 1.5 kilohms. |
| R6c | 2.2 kilohms. |
| R7c | 120 ohms. |
| R8c | 10 ohms. |

| | |
|---|---|
| R9c | 10 ohms. |
| R12c | 6 kilohms. |
| R13c | 1.5 kilohms. |
| CR-1c | Texas Instruments 652c. |
| CR-2c | International Rectifier Corp. Type 30 LM1. |
| Q-2c | 2N35. |
| Q-3c | 2N102. |
| Q-4c | 2N174. |
| Q-5c | 2N34. |
| Q-6c | 2N34. |
| C1c | 100 microfarads. |

The current that flows through the reference diode CR-1 in the circuit of FIGURE 1, for example, is composed of two parts. There is the normal bias current through the resistor R5 and there is the emitter current of transistor Q-1. Variations of current drawn by the transistor Q-1 can cause some slight variation of the reference voltage. This can be overcome by suitable circuit design, including proper choice of resistor R5. The circuits using the differential amplifier configuration are more flexible in this respect and provide essentially constant current through the reference diodes CR-1c and CR-1d (FIGURES 4 and 5, respectively) since each reference diode current is controlled practically entirely by its bias resistor (R5c and R5d respectively in FIGURES 4 and 5). This current can then be set to the exact level required for zero temperature coefficient operation of the reference diode. The reference Zener breakdown diodes have a reverse voltage breakdown characteristic which has a substantially constant voltage drop across the diode for sufficiently large currents through it exceeding the so-called Zener point of the characteristic. The drop-off part of the characteristic is practically a vertical line for any particular ambient temperature. However, as the ambient temperature is varied, a greatly magnified view of the different ambient temperature characteristics shows that they do not coincide exactly along the vertical drop portion of the different characteristics except at an intersection point of the characteristic curves. This is the level set by bias resistors R5c or R5d.

FIGURE 6 shows the circuit of FIGURE 5 modified to use lamps DS-1e and DS-2e in the comparator section, which section is similar to that of FIGURE 3 except that a differential amplifier is employed. Resistors R3e and R11e correspond respectively to resistors R3b and R11b of the circuit of FIGURE 3. A larger error signal can thus be made available to the differential amplifier, and the circuit of FIGURE 6 functions exactly the same as previously described for the circuits of FIGURES 3 and 5. The positive terminal of the battery and the positive brush of the D.C. generator are grounded in the circuit of FIGURE 6.

Regulation of A.C. machines is also readily accomplished with my invention. FIGURE 7 shows a circuit wherein an A.C. alternator 9 is controlled to provide a regulated A.C. output and a regulated D.C. output. The brushes riding on a commutator of a D.C. generator wear out very quickly when the D.C. generator is subjected to strenuous activity and use. For this reason, police patrol vehicles, for example, prefer to replace the D.C. generator with an A.C. machine because the slip rings in such machines do not tax their brushes as severely as does a commutator. Further, the A.C. output can be directly transformed and a vibrator can be eliminated in certain applications. The regulated D.C. output is obtained from rectifying the A.C. output of alternator 9, and is used to charge the usual battery (not shown) and to supply D.C. loads. Field winding 9a is connected as shown so as to be supplied directly from this battery which, for the circuit of FIGURE 7, has a negative grounded terminal. If the ignition switch (not shown) is used to connect terminal B to terminal C, the upper end of field winding 9a is preferably connected after the ignition switch to terminal C, for example.

The main difference between my regulator circuit for an A.C. machine and that for the D.C. generator is that the cutout diode, CR-2f in FIGURE 7, also functions as a rectifier and therefore must be properly positioned in the circuit. Diode CR-2f is connected to terminal A as shown and rectifies the A.C. output of alternator 9. This rectified output is used to charge the battery connected to terminal C and to supply the regulator circuit. A filter capacitor C2f can be connected from the cathode of cutout and rectifier diode CR-2f to ground to smooth out the rectified output from diode CR-2f. The circuit of FIGURE 7 operates and functions in the same manner as that of FIGURE 5, the current flowing in field winding 9a being governed by the regulator circuit. It is noted that while the field winding for the D.C. generator in FIGURES 1 through 6 is self supplied, that is, connected directly to the armature of the D.C. generator and not to the battery, residual field magnetism permits the D.C. generator output to develop and build up. Residual field magnetism can accomplish the same result in the A.C. regulator circuits when the field supply battery is fully discharged.

FIGURE 8 shows a regulator circuit for governing the output of an A.C. machine, the regulator circuit being similar to the circuit of FIGURE 6. Here, as in the circuit of FIGURE 7, cutout diode CR-2g functions additionally as a rectifier which is assisted by rectifier capacitor C2g. These two rectifier elements are positioned so that their rectified output can be used to supply the regulator circuit and the regulated D.C. output used to charge a battery which supplies the field winding. Circuit operation of the regulator shown in FIGURE 8 is, of course, essentially the same as that of FIGURE 6 for a D.C. generator. The regulator circuits shown in FIGURES 7 and 8 can be considered universal regulators capable of regulating either A.C. or D.C. machines.

Thus, a high quality and reliable electrical regulator is provided which is useful for regulating the output of both A.C. and D.C. generating machines. The invention is free from the frequently encountered failure of relay contacts, particularly in voltage regulation, where vibrating contact devices are widely used at present. The invention provides extremely precise regulation with excellent transient response, and radio noise generation found with constantly vibrating type circuit devices are accordingly avoided. The regulator by its nature is relatively free from consistently moving parts and is not sensitive to vibration and humidity to any extent. The device can be made as compact as desired and can be miniaturized to an extremely small size.

It is to be understood that the particular embodiment of my invention described above and shown in the attached drawings is merely illustrative of and not restrictive of the broad invention, and that various changes in design, structure and arrangement may be made without departing from the spirit and scope of the broader of the appended claims.

I claim:

1. In an electrical system including a generator having a field winding wherein the generator is mechanically driven to produce an electrical output, an electrical regulator for regulating the output of the generator, comprising: means for detecting an error signal in the output of the generator, said detecting means including a divider network having the output of the generator applied across said divider network, a series combination of a diode connected in series with a resistor and having the output of the generator applied across said series combination, the diode operating in the reverse current region of the diode reverse voltage breakdown characteristic, and means connected to an intermediate point on said divider network and to said series combination between the diode and resistor for sensing an error signal in the output of the generator; means connecting with said detecting means responsive to the error signal for regulating current in the field winding to reduce the error signal, whereby the output of the generator is correctly maintained; and means for limiting the output of the generator to a specified maximum current, said limiting means including a relay operatively responsive for a generator output at and above the specified maximum current to decrease current in the field winding and reduce the output of the generator, whereby burning out of the generator is prevented.

2. In an electrical system including a generator having a field winding wherein the generator is mechanically driven to produce an electrical output, an electrical regulator for regulating the output of the generator, comprising: means for detecting an error signal in the output of the generator, said detecting means including a divider network having the output of the generator applied across said divider network, a series combination of a diode connected in series with a resistor and having the output of the generator applied across said series combination, the diode operating in the reverse current region of the diode reverse voltage breakdown characteristic, and means including a differential amplifier having two inputs respectively connected to an intermediate point on said divider network and to said series combination between the diode and resistor for sensing an error signal in the output of the generator; and means connecting with said differential amplifier responsive to the error signal for regulating current in the field winding to reduce the error signal, whereby the output of the generator is correctly maintained.

3. In an electrical system including a generator having a field winding wherein the generator is mechanically driven to produce an electrical output, and a battery adapted to be charged by the output of the generator, a universal electrical regulator for regulating the output of the generator, comprising: means for detecting an error signal in the output of the generator, said detecting means including a divider network having the output of the generator applied across said divider network, a series combination of a diode connected in series with a resistor and having the output of the generator applied across said series combination, the diode operating in the reverse current region of the diode reverse voltage breakdown characteristic, and means including a differential amplifier having two inputs respectively connected to an intermediate point on said divider network and to said series combination between the diode and resistor for sensing an error signal in the output of the generator; means for amplifying the error signal detected; rectifying means connecting the output of the generator to said detecting means and said amplifying means; means responsive to the amplified error signal for regulating current in the field winding to reduce the error signal, whereby the output of the generator is correctly maintained; and means responsive to a specified maximum output from the generator for de-energizing said amplifying means to reduce the output of the generator and prevent burning out of the same.

4. In an electrical system including a generator having a field winding wherein the generator is mechanically driven to produce an electrical output, and a battery adapted to be charged by the output of the generator, an electrical regulator for regulating the output of the generator, comprising: means for detecting an error signal in the output of the generator, said detecting means including a divider network having the output of the generator applied across said divider network, a series combination of a diode connected in series with a resistor and having the output of the generator applied across said series combination, the diode operating in the reverse current region of the diode reverse voltage breakdown characteristic, and means including a differential amplifier having two inputs respectively connected to an intermediate point on said divider network and to said series combination between the diode and resistor for sensing an error signal in the output of the generator; diode rectifying means connecting the output of the generator to said detecting means; means for amplifying the error signal detected; means responsive to the amplified error signal for regulating current in the field winding to reduce the error signal, whereby the output of the generator is correctly maintained; and means including a relay operatively responsive to a specified maximum output from the generator for de-energizing said amplifying means to reduce the output of the generator and prevent burning out of the same.

References Cited in the file of this patent

UNITED STATES PATENTS

| | | |
|---|---|---|
| 2,809,301 | Short | Oct. 8, 1957 |
| 2,862,175 | Guyton et al. | Nov. 25, 1958 |
| 2,890,404 | Cronin | June 9, 1959 |
| 2,892,143 | Sommer | June 23, 1959 |